US012789311B2

(12) United States Patent
Naumann et al.

(10) Patent No.: US 12,789,311 B2
(45) Date of Patent: Nov. 10, 2026

(54) MULTIFUNCTION SPINDLE FOR A MACHINE TOOL

(71) Applicant: NSH Technology GmbH, Chemnitz (DE)

(72) Inventors: Hans J. Naumann, Chemnitz (DE); Adolf Kochsiek, Leopoldshohe (DE); Moritz Halle, Chemnitz (DE)

(73) Assignee: NSH Technology GmbH, Chemnitz (DE)

( * ) Notice: Subject to any disclaimer, the term of this patent is extended or adjusted under 35 U.S.C. 154(b) by 705 days.

(21) Appl. No.: 17/989,860

(22) Filed: Nov. 18, 2022

(65) Prior Publication Data

US 2023/0083036 A1 Mar. 16, 2023

Related U.S. Application Data

(63) Continuation-in-part of application No. PCT/DE2021/000093, filed on Apr. 20, 2021.

(30) Foreign Application Priority Data

May 20, 2020 (DE) ........................ 202020002230.6

(51) Int. Cl.
*B23Q 17/22* (2006.01)
*B23Q 1/52* (2006.01)

(52) U.S. Cl.
CPC ........... *B23Q 17/2216* (2013.01); *B23Q 1/52* (2013.01); *B23Q 2220/006* (2013.01)

(58) Field of Classification Search
CPC ..... Y10T 82/14; Y10T 82/141; Y10T 82/142; Y10T 82/143; Y10T 82/145; Y10T 82/147; Y10T 82/148; Y10T 82/149; Y10T 409/307672; Y10T 409/308232; Y10T 409/308512; Y10T 409/304312; Y10T 408/76; Y10T 409/309352; B23Q 27/00; B23Q 11/0032; B23Q 11/0035; B23Q 1/70; B23Q 17/0928; B23Q 17/0933; B23Q 17/0938; B23Q 17/0942; B23Q 17/0947; B23Q 17/0971; B23Q 17/0976; B23Q 17/12; B23Q 17/22; B23Q 17/2233; B23Q 17/2266; B23Q 17/2275; B23B 29/03421; B23B 29/03457; B23C 1/12
See application file for complete search history.

(56) References Cited

U.S. PATENT DOCUMENTS

| | | | |
|---|---|---|---|
| 4,370,080 | A | 1/1983 | Goode |
| 4,626,144 | A | 12/1986 | Berner |
| 6,428,253 | B1 | 8/2002 | Kochsiek |

(Continued)

FOREIGN PATENT DOCUMENTS

| | | | |
|---|---|---|---|
| CN | 103118833 | A | 5/2013 |
| CN | 108778616 | A | 9/2018 |

(Continued)

*Primary Examiner* — Sunil K Singh

(57) ABSTRACT

A multifunction spindle for a machine tool for machining workpieces has a spindle housing, rotational drive, and tool-holding unit. The tool-holding unit is disposed within the spindle housing and pivots relative to the spindle housing about an axis perpendicular to the axis of rotation. The spindle has two measurement heads connected to a transmission path for measuring position angle and enhances positioning accuracy.

4 Claims, 3 Drawing Sheets

(56) References Cited

U.S. PATENT DOCUMENTS

Figure 1:
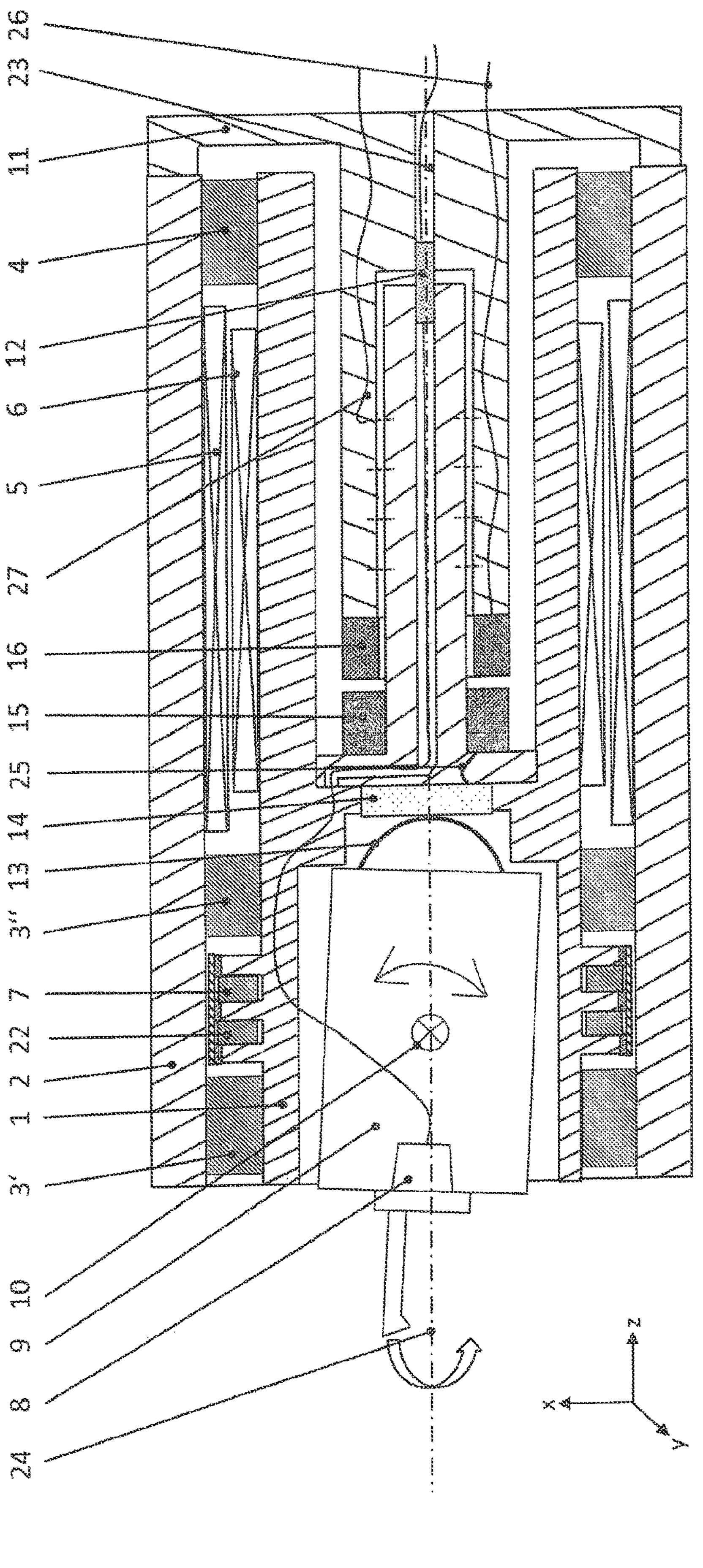

| | | | | |
|---|---|---|---|---|
| 9,227,282 | B2 * | 1/2016 | Fronius | B23C 3/055 |
| 10,245,652 | B2 * | 4/2019 | Mann | B23B 37/00 |
| 2020/0086436 | A1 | 3/2020 | Kochsiek | |

FOREIGN PATENT DOCUMENTS

| | | | |
|---|---|---|---|
| DE | 2422948 | A1 | 12/1975 |
| DE | 10348801 | B3 | 6/2005 |
| EP | 0673710 | A1 | 9/1995 |
| WO | 82/00353 | | 2/1982 |

* cited by examiner

MULTIFUNCTION SPINDLE FOR A MACHINE TOOL

This application is a continuation-in-part of PCT/DE2021/000093 having an international filing date of Apr. 20, 2021 which claims the benefit of German application no. 20 2020 002 230.6, filed on May 20, 2020, both of which are herein incorporated by reference.

The invention relates to a multifunction spindle for a machine tool for machining workpieces, comprising a spindle housing, a rotational drive, and a tool-holding unit, wherein the tool-holding unit is disposed within the spindle housing and can pivot relative to the spindle housing about an axis perpendicular to the axis of rotation.

Machine tools for machining workpieces have been known in numerous designs. In lathes, the workpiece is rotated, while the stationary tool is moved axially and radially relative to the workpiece in order to form round, rotationally symmetric contours. In drilling machines, the tool rotates and is driven against a stationary workpiece in order to form bores in the workpiece. In milling machines, a rotating tool is moved radially and axially relative to a stationary workpiece in order to form milled grooves, milled surfaces, or free-form surfaces in the workpiece. In the machine tool types described above, the tools are usually accommodated and firmly clamped in a tool spindle via a tool interface. On principle, a tool spindle comprises a rotational drive, a rotating drive shaft and an output shaft, into which a tool-holding unit is integrated. Such tool spindles are also used in machining centres, where they are automatically loaded with the appropriate tools. Furthermore, such tool spindles are suitable for machine tools for the manufacture of non-round contours. These machining operations are usually referred to as cam turning or polygonal turning. In this process, a rotating tool with a cutting head and an also rotating workpiece are controlled so as to control their revolutions relative to each other.

For the different machining processes, the tool spindles initially needed to be specifically modified. Meanwhile, however, a multifunctionally usable tool spindle has been known from EP 3 216 557 which is suitable both for conventional machining operations such as turning, boring, and milling, and for novel machining operations such as polygonal turning. This tool spindle comprises in a manner known per se a housing, a rotational drive, and a tool-holding unit. Now, however, the tool-holding unit is arranged within the spindle housing and can be moved relative to the spindle housing about an axis perpendicular to the drive shaft.

Within the scope of the present description of the invention, such a basic principle of a tool spindle suitable for different machining processes to be performed on a machine tool is in the following referred to as “multifunction spindle”.

Although the basic principle of such a multifunction spindle offers interesting opportunities for numerous applications, only little acceptance has been achieved in the market, so far. This is probably due to functional defects occurring with polygonal turning at higher speeds. In such operating points, the then considerable influence of imbalances can be compensated only insufficiently with the designs of metrology equipment, coolant supply, and imbalance compensation described in EP 3 216 557.

A similar principle of such a multifunction spindle is described in EP 0 922 528 B1 where, probably due to the use of only one measuring system, either the required accuracy in positioning, or the functional reliability of the axis arranged perpendicular to the drive shaft can be achieved. Such a spindle, however, cannot be used commercially due to the lack of positioning accuracy or the design which is not functionally reliable.

The problem addressed by the invention is that of providing a multifunction spindle which, in particular during the turning of polygonal profiles, allows fast and largely complete compensation of occurring imbalances as well as an increase in positioning accuracy of the axis arranged perpendicular to the drive shaft, while establishing functional reliability at the same time.

This problem is solved in that for the purpose of increasing the positioning accuracy, at least two mutually independent and immediately adjacent measurement heads for sensing identical position angles are connected to the tool-holding unit, by means of which measuring heads the measured position angle signals can be transmitted using a transmission unit on at least two mutually independent transmission paths to a controller of the machine tool equipped with the multifunction spindle. In this process, at least one transmission path is used for position control, and at least one transmission path is used to establish the functional safety of the pivot axis positioned perpendicular to the drive shaft. The transmission unit contactlessly supplies power to at least two connected measurement heads. The transmission unit consists of at least two parts which rotate relative to each other at the spindle rotational speed. Furthermore, the transmission unit comprises a central bore through which media ducts are passed centrally.

One embodiment provides that the spindle shaft has at least two annular grooves arranged axially adjacent to each other, in each of which grooves an annular segment is arranged which can be supplied via ducts with hydraulic fluid in such a way that its relative position within the annular groove can be adjusted for the purpose of compensation of imbalances.

According to the invention, in contrast to the state of the art, two measurement heads are used. Both measurement heads are each used to detect a position angle assumed by the tool holding unit. The position angle is recorded redundantly, i.e. the two measurement heads each record the same position angle.

According to the invention, a transmission unit is further provided. This transmission unit is connected to the two measurement heads and is therefore in communication with them. In the intended use, the transmission unit makes it possible to transmit position angle signals corresponding to the measured position angles from the measurement heads to a higher-level controller, for example a controller of a machine tool equipped with the multifunction spindle. The transmission unit allows one position angle signal to be transmitted for each detected position angle. A position angle measurement is therefore carried out for each measurement head, with one position angle signal being output for each measurement head. In the intended use, the higher-level controller therefore has two position angle signals, with one position angle signal coming from the first measurement head and the other position angle signal from the second measurement head. Both measurement heads measure the same position angle, as explained above.

For independent transmission of both position angle signals, the transmission unit provides two independent transmission paths according to the invention. The measurement heads are set up to generate position angle signals corresponding to the measured position angles and to transmit them to a higher-level controller by means of the transmission paths. One transmission path is set up to control the position of the swivel axis lying transverse to the drive axis, whereas the other transmission path is set up to establish the functional reliability of the swivel axis lying transverse to the drive axis.

"Functional reliability" in the sense of the invention means in particular the reliability to be achieved during intended operation of the multifunctional spindle according to the invention, which depends on correct functioning of the multifunctional spindle, namely the safe setting and checking of the position angle to be assumed by the tool holding unit. In prior art systems, only one measurement head is used. This enables the tool holding unit to be tracked in the event of a detected position angle deviation. However, it is not possible to check the multifunctional spindle for the specific function to be performed with regard to the desired position angle. The design according to the invention provides a remedy here, because the redundant arrangement of two measurement heads on the one hand and the provision of two independent transmission paths on the other hand make it possible to carry out redundant detection of the position angle of the tool holding unit on the one hand and on the other hand to have the position angle signals supplied evaluated redundantly by a higher-level control unit. This results in the advantage that the functional reliability of the multifunction spindle according to the invention is established with a simultaneous increase in the positioning accuracy.

As a result, the design according to the invention differs from the state of the art in particular in that two measurement heads are provided, which independently of one another measure the same position angle assumed by the tool holding unit. The measurement heads are in communication with a higher-level control unit, for which purpose a transmission unit is provided. This transmission unit provides two separate transmission paths, each transmission path interacting with a measurement head. This enables direct signal transmission from each measurement head to the higher-level control unit, with signal transmission in the transmission paths taking place independently of one another. The higher-level control unit thus has a position measurement signal for each transmission path, which can then be processed in further proceedings. The design according to the invention thus makes it possible to ensure functional reliability with regard to the position angle measurement by the tool holding unit, since a separate measurement head is provided for this purpose, whose signals are transmitted via a separate transmission path to a higher-level control system for evaluation. Data evaluation for the purpose of safety checking is thus carried out independently of data evaluation for setting the desired position, thus ensuring functional reliability.

Another advantageous embodiment provides that the spindle housing is equipped with at least two mutually independent rotary joints. At least one of these rotary joints is designed to receive hydraulic supply ducts to provide a hydrodynamic bearing of the spindle shaft. Such a hydrodynamic bearing is established as a consequence of a defined and adapted bleed oil flow from the control ducts of the rotary joint by superpositioning with the rotary speed of the machine spindle. The other rotary joint centrally and without leakage losses preferably supplies cooling lubricant and pneumatics. Such a separation between the hydraulic rotary joint and the rotary joint for cooling lubricant allows contamination-free formation of the hydrodynamic bearing.

Figure 2:
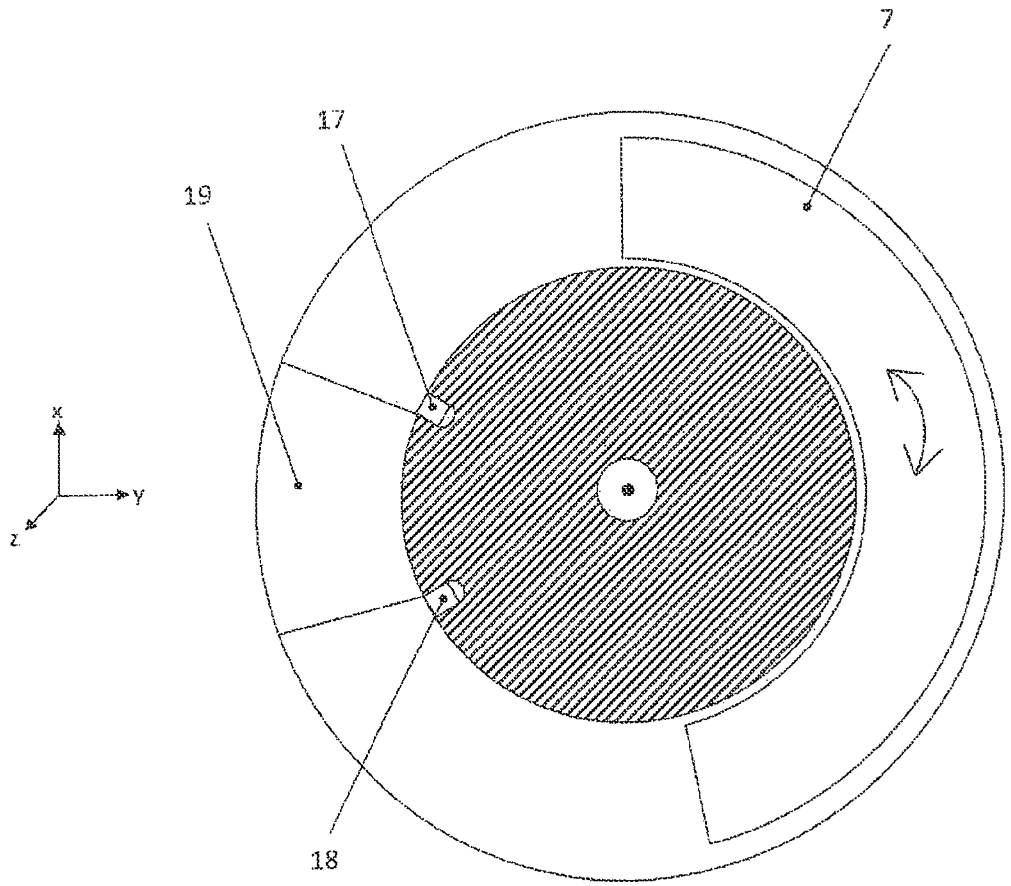
Figure 3:
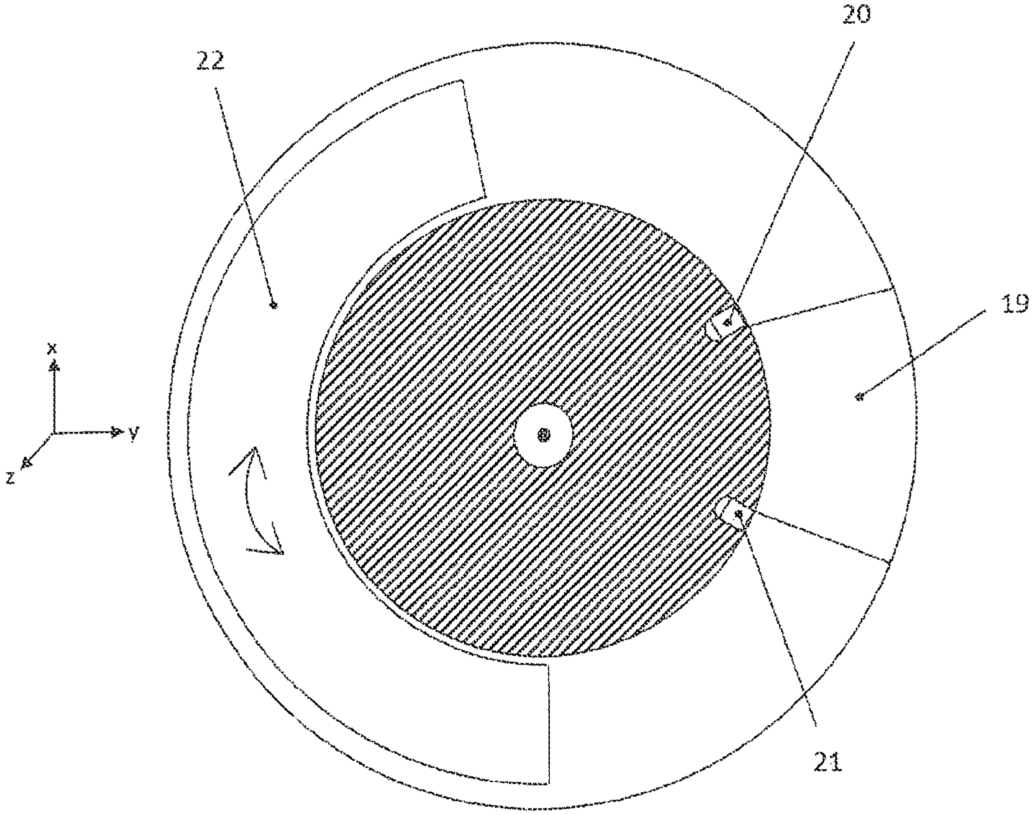

Other advantageous designs will be described based on the drawings as exemplary embodiments in the following. In these drawings, FIG. 1 is a sectional view of the structure of a multifunction spindle according to the invention FIG. 2 shows the arrangement of a first annular segment for compensation of imbalances FIG. 3 shows the arrangement of a second annular segment for compensation of imbalances The multifunction spindle shown in FIG. 1 is designed for a machine tool for machining workpieces. A spindle shaft 1 is arranged in a spindle housing 2. The spindle shaft 1 is supported by an anterior bearing 3 and a posterior bearing 4 in the spindle housing 2. The anterior bearing 3 is formed by two separate bearing segments 3' and 3". The spindle shaft 1 rotates about an axis 24. The rotational drive required for this rotation comprises a stator unit 5 and a rotor unit 6.

The multifunction spindle comprises at least two rotary joints or ducts 11 for hydraulics and pneumatics as well as 12 and 23 for cooling lubricant and pneumatics.

On the end section directed towards the workpiece (not shown), the spindle shaft 1 has a recess in which a tool-holding unit 9 is arranged. This tool-holding unit 9 is disposed so that it can pivot relative to the spindle housing 2 about an axis 10 perpendicular to the axis of rotation 24. The pivot motion is shown stylised by an arched arrow.

A tool 8 is clamped in the tool-holding unit 9 on the end face directed towards the workpiece. A material measure 13 is arranged on the opposite end face. Two measuring heads 14 are arranged immediately adjacent to the material measure 13. In the further course, a telemetric transmitter 15 and a telemetric receiver 16 are arranged behind the measuring heads 14.

A first annular segment 22 and a second annular segment 7 are arranged at a short distance from each other between the bearing segments 3' and 3". The two annular segments 22 and 7 have an annular contour and are each guided in a continuous annular groove extending in circumferential direction on spindle shaft 1. By the annular segments 7 and 22, a compensation of imbalances is realised during operation of the multifunction spindle, which will be explained in more detail below. For this purpose, at least two such annular segments 22 and 7 are required. More annular segments may also be provided, however.

The data to be collected during operation of the multifunction spindle and the adjustments of parameters possibly to be made are generated either wirelessly or via measuring lines. In the drawing, such measuring lines are shown stylised in an exemplary manner as line 25 to a measuring head 14, as line 26 to a telemetric receiver 16, and as line 27 to hydraulics and pneumatics components.

If during operation of the multifunction spindle while machining of a workpiece, a deviation of position of the tool-holding unit 9 relative to its optimal position—and thereby the risk of imbalances—should occur, this irregularity is detected by the material measure 13 in operative connection with the measuring heads 14. The corresponding signals are transmitted to the machine controller which triggers a change in the supplied hydraulics quantities in the annular grooves of the annular segments 7 and 22.

According to FIG. 2, hydraulics are supplied via the bores 17 and 18 to the annular groove in which the annular segment 7 is arranged. The bores 17 and 18 are arranged on the end sections of the annular groove interrupted by a pressure chamber partition 19. In this manner, the relative position of the annular segment 7 within this annular groove may be changed.

At the same time, according to FIG. 3, hydraulics are supplied via the bores 20 and 21 to the annular groove in which the annular segment 22 is arranged. The bores 20 and 21 are arranged on the end sections of the annular groove interrupted by a pressure chamber partition 19. In this manner, the relative position of the annular segment 22 within this annular groove may be changed.

Thereby it is possible that the annular segments 7 and 22 are dislocated to a position offset relative to each other preferably by 180°, so that the imbalances that have occurred can be very well compensated. As imbalances occur especially during the machining of polygonal profiles, the multifunction spindle according to the invention is particularly advantageous for polygonal turning.

Embodiment 1. Multifunction spindle for a machine tool for machining workpieces, comprising a spindle housing, a rotational drive, and a tool-holding unit, wherein the tool-holding unit is disposed within the spindle housing and can pivot relative to the spindle housing about an axis perpendicular to the axis of rotation, characterised in that at least two mutually independent and immediately adjacent measurement systems for sensing identical position angles are connected to the tool-holding unit, by which measurement systems the measured position angle signals can be transmitted using a transmission unit on at least two mutually independent transmission paths to a controller of the machine tool equipped with the multifunction spindle, wherein at least one transmission path is used for position control, and at least one transmission path is used to establish the functional reliability of the pivot axis positioned perpendicular to the drive shaft, wherein the transmission unit contactlessly supplies power to at least two connected measurement systems, wherein the transmission unit consists of at least two parts which rotate relative to each other at the spindle rotational speed, and wherein the transmission unit has a central bore through which media ducts are passed centrally.

Embodiment 2. Multifunction spindle according to embodiment 1, characterised in that the spindle shaft (1) has at least two axially adjacent annular grooves, in each of which an annular segment (7, 22) is arranged which can be supplied via ducts with hydraulics in such a way that its relative position within the annular groove can be adjusted.

Embodiment 3. Multifunction spindle according to embodiment 2, characterised in that an anterior bearing of the spindle shaft (1) is designed with two separate bearing segments (3', 3"), and that between the bearing segments (3', 3"), a first annular segment (7) and a second annular segment (22) are arranged at a short distance from each other, each of which segments has an annular contour and is guided in a continuous annular groove extending in circumferential direction on spindle shaft (1).

Embodiment 4. Multifunction spindle according to embodiment 2, characterised in that each annular groove has supply bores (17, 18, 20, 21) for hydraulics, wherein the bores (17, 18, 20, 21) are spaced from one another on the two end sections of the annular grooves interrupted by a pressure chamber partition (19).

Embodiment 5. Multifunction spindle according to embodiment 1, characterised in that the spindle housing (2) is equipped with at least two mutually independent rotary joints (11, 12, 23), wherein at least one of these rotary joints (11) is designed to accommodate hydraulic supply ducts for a hydrodynamic bearing of the spindle shaft (1) which bearing is established as a consequence of a defined and adapted bleed oil flow from the control ducts of the rotary joint (11) by superpositioning with the rotational speed of the machine spindle, and wherein the at least one other rotary joint (12, 23) is designed for a central passage of cooling lubricant and pneumatics.

LIST OF REFERENCE NUMERALS

1 spindle shaft
2 spindle housing
3 anterior bearing of the spindle shaft
3' separate bearing segment
3" separate bearing segment
4 posterior bearing of the spindle shaft
5 stator unit
6 rotor unit
7 annular segment
8 tool
9 tool-holding unit
10 pivot axis perpendicular to the spindle's axis of rotation
11 rotary joint, hydraulics and pneumatics
12 rotary joint, cooling lubricant and pneumatics
13 material measure
14 measuring heads
15 telemetric transmitter
16 telemetric receiver
17 bore to the annular groove for annular segment 7
18 bore to the annular groove for annular segment 7
19 pressure chamber partition
20 bore to the annular groove for annular segment 22
21 bore to the annular groove for annular segment 22
22 annular segment
23 rotary joint, cooling lubricant and pneumatics
24 axis of rotation of the spindle shaft
25 line to the measuring head
26 line to the telemetric receiver
27 line to hydraulics/pneumatics components

The invention claimed is:

1. A multifunction spindle comprising a spindle housing, a spindle shaft, a rotational drive, and a tool-holding unit, wherein the spindle shaft has at least two axially adjacent annular grooves, in each of which an annular segment is arranged which can be supplied via ducts with hydraulics such that its relative position within the annular groove can be adjusted, and wherein the tool-holding unit is disposed within the spindle housing and pivots relative to the spindle housing about an axis perpendicular to the axis of rotation, wherein at least two mutually independent and adjacent measurement heads for sensing identical position angles are connected to the tool-holding unit by which measurement heads the measured position angle signals are transmitted using a transmission unit on at least two mutually independent transmission paths to a controller of the machine tool equipped with the multifunction spindle, wherein at least one transmission path is used for position control and at least one transmission path establishes functional safety of the pivot axis positioned perpendicular to the drive shaft, wherein the transmission unit supplies power, without contact, to at least two connected measurement heads, wherein the transmission unit consists of at least two parts which rotate relative to each other at the spindle rotational speed, and wherein the transmission unit has a central bore through which media ducts are passed centrally.

2. The multifunctional spindle of claim 1, wherein an anterior bearing of the spindle shaft is designed with two separate bearing segments and further wherein a first annular segment and a second annular segment are arranged between the bearing segments, each segment having an annular contour and guided in a continuous annular groove extending in circumferential direction on the spindle shaft.

3. The multifunction spindle of claim 1, wherein each annular groove has supply bores for hydraulics, wherein the bores are spaced from one another on the two end sections of the annular grooves interrupted by a pressure chamber partition.

4. The multifunction spindle of claim 1, wherein the spindle housing is equipped with at least two mutually independent rotary joints, wherein at least one rotary joint accommodates hydraulic supply ducts for a hydrodynamic bearing of the spindle shaft which bearing is established as a consequence of a bleed oil flow from the control ducts of the rotary joint by superpositioning with the rotational speed of the machine spindle, and wherein the at least one other rotary joint accommodates cooling lubricant ducts and pneumatic lines for a central passage of cooling lubricant and pneumatics.

* * * * *